(12) United States Patent
Venkataramani et al.

(10) Patent No.: US 9,841,195 B2
(45) Date of Patent: Dec. 12, 2017

(54) NON-STICK, PYROLYTIC COATINGS FOR HEATING DEVICES

(71) Applicant: General Electric Company, Schenectady, NY (US)

(72) Inventors: Venkat Subramaniam Venkataramani, Clifton Park, NY (US); Ravikanth Raju Abbaraju, Bangalore (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 561 days.

(21) Appl. No.: 13/780,701

(22) Filed: Feb. 28, 2013

(65) Prior Publication Data

US 2014/0238379 A1    Aug. 28, 2014

(51) Int. Cl.
| | | |
|---|---|---|
| *F24C 14/00* | (2006.01) | |
| *A47J 36/02* | (2006.01) | |
| *C04B 35/624* | (2006.01) | |
| *B05D 5/08* | (2006.01) | |
| *C23C 18/12* | (2006.01) | |
| *B05D 3/00* | (2006.01) | |
| *C04B 35/14* | (2006.01) | |
| *F24C 15/00* | (2006.01) | |

(52) U.S. Cl.
CPC .......... *F24C 14/00* (2013.01); *A47J 36/025* (2013.01); *B05D 3/007* (2013.01); *B05D 5/08* (2013.01); *C04B 35/14* (2013.01); *C04B 35/624* (2013.01); *C23C 18/122* (2013.01); *C23C 18/1225* (2013.01); *C23C 18/1241* (2013.01); *C23C 18/1254* (2013.01); *F24C 15/005* (2013.01); *C23C 18/1216* (2013.01); *C23C 18/1245* (2013.01)

(58) Field of Classification Search
CPC .............. C23C 18/1254; C23C 18/122; C23C 18/1216; C23C 18/1241; C23C 18/1225; C23C 18/1245; C04B 35/14; C04B 35/624; F24C 15/005; F24C 14/00; B05D 3/007; B05D 5/08; A47J 36/025
See application file for complete search history.

(56) References Cited

U.S. PATENT DOCUMENTS

| | | |
|---|---|---|
| 4,180,482 A | 12/1979 | Nishino et al. |
| 4,560,620 A | 12/1985 | Arai |
| (Continued) | | |

OTHER PUBLICATIONS

Palmisano et al., "Household Oven Self-Cleaning Surfaces via Catalytic Thermal Oxidation", Chemical Engineering Journal—XVIII International Conference on Chemical Reactors—Chemreactor—18, Nov. 15, 2009, vol. 154, Issues 1-3, pp. 251-257.

(Continued)

*Primary Examiner* — Jonathan Langman
(74) *Attorney, Agent, or Firm* — Dority & Manning, P.A.

(57) ABSTRACT

In accordance with one aspect of the present invention, a heating device is presented. The heating device includes a pyrocatalytic, non-stick coating disposed on at least one surface. The pyrocatalytic non-stick coating includes (i) a binder derived from a silane, a polysiloxane, a polysilazane, or combinations thereof; and (ii) a catalyst dispersed within the binder, wherein the catalyst comprises a pervoskite crystalline material, a pyrochlore crystalline material, a spinel crystalline material, an ilmenite crystalline material, or combinations hereof.

12 Claims, 2 Drawing Sheets

(56) References Cited

U.S. PATENT DOCUMENTS

Figure 1:
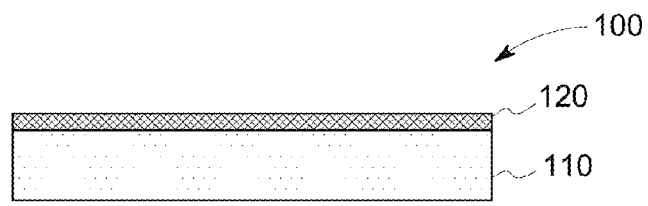

| | | | |
|---|---|---|---|
| 4,831,237 A | 5/1989 | Gelineau | |
| 6,656,425 B1* | 12/2003 | Benthien | A61L 9/01 |
| | | | 422/120 |
| 7,303,784 B2 | 12/2007 | Nonninger et al. | |
| 7,339,142 B2 | 3/2008 | Pessayre et al. | |
| 7,683,293 B2 | 3/2010 | Buzzi et al. | |
| 7,695,831 B2 | 4/2010 | Shon et al. | |
| 7,696,128 B2 | 4/2010 | Jordens et al. | |
| 7,854,222 B2 | 12/2010 | Venkataramani et al. | |
| 7,879,449 B2 | 2/2011 | Jeon et al. | |
| 2008/0017074 A1* | 1/2008 | Park | A47J 36/04 |
| | | | 106/404 |
| 2009/0325782 A1* | 12/2009 | Venkataramani | A47J 36/02 |
| | | | 502/2 |
| 2010/0081569 A1 | 4/2010 | Sepeur et al. | |
| 2011/0139141 A1* | 6/2011 | Shaffer | C23C 28/04 |
| | | | 126/273 R |
| 2011/0293950 A1* | 12/2011 | Kim | A47J 36/025 |
| | | | 428/447 |

OTHER PUBLICATIONS

Palmisano et al., "A New Concept for a Self-Cleaning Household Oven", Chemical Engineering Journal—XIX 4 International Conference on Chemical Reactors (Chemreactor—19), Dec. 1, 2011, vol. 176-177, pp. 253-259.

* cited by examiner

NON-STICK, PYROLYTIC COATINGS FOR HEATING DEVICES

BACKGROUND

In one aspect, the present invention provides non-stick, pyrolytic coatings for heating devices. In a particular aspect, the present invention provides non-stick, pyrolytic coatings, which are particularly useful for self-cleaning heating devices.

Heating devices such as ovens, irons, and cooking surfaces, are often covered with a hard and resistant layer so that foodstuffs, starch, dirt, and the like that can build up on surfaces of these devices during use may be readily cleaned. For example, the walls of an oven are often coated with a smooth enamel coating so that foodstuffs do not permanently adhere to the surface when the oven is in a self-cleaning mode. Self-cleaning modes for current surface finishes may generally require exposing the oven interior to temperatures in excess of 850° F., to completely ash the attached foodstuffs, thereby permitting the end user to wipe away the resulting ash from the surface.

Because of the high temperatures used during the self-cleaning mode, a significant amount of thermal insulation about the oven interior may be desirable to prevent damage to the electronics. For example, wiring currently used to operate the oven typically requires special high-temperature insulation, which may represent additional overhead in the manufacture of the oven. To reduce the cost associated with the insulation and enable design changes within the oven chamber, it may be desirable to reduce the self-cleaning temperatures. A lower temperature self-cleaning cycle may allow use of conventional insulation in wiring, latches, door construction, fans, and the like, thereby reducing the overall cost and enabling additional product enhancement.

Accordingly, there is a need for improved coatings used in heating devices so as to improve cleanability, as well as reduce costs associated with current heating device design.

BRIEF DESCRIPTION OF THE INVENTION

In accordance with one aspect of the present invention, a heating device is presented. The heating device includes a pyrocatalytic, non-stick coating disposed on at least one surface. The pyrocatalytic non-stick coating includes (i) a binder derived from a silane, a polysiloxane, a polysilazane, or combinations thereof; and (ii) a catalyst dispersed within the binder, wherein the catalyst comprises a pervoskite crystalline material, a pyrochlore crystalline material, a spinel crystalline material, an ilmenite crystalline material, or combinations hereof.

In accordance with another aspect of the present invention, a self-cleaning oven is presented. The self-cleaning oven includes an enameled surface defining at least a portion of an oven chamber, and a pyrocatalytic, non-stick coating disposed on the enameled surface. The pyrocatalytic non-stick coating includes (i) a binder derived from a silane, a polysiloxane, a polysilazane, or combinations thereof; and (ii) a catalyst dispersed within the binder, wherein the catalyst comprises a pervoskite crystalline material, a pyrochlore crystalline material, a spinel crystalline material, an ilmenite crystalline material, or combinations hereof.

In accordance with yet another aspect of the present invention, a method is presented. The method includes providing a catalyst comprising a pervoskite crystalline material, a pyrochlore crystalline material, a spinel crystalline material, an ilmenite crystalline material, or combinations hereof. The method further includes providing a binder material comprising a silane, a polysiloxane, a polysilazane, or combinations thereof. The method further includes contacting the catalyst with the binder material to form a coating composition, and disposing the coating composition on a surface of a substrate. The method further includes heat-treating the coating composition to form a pyrocatalytic non-stick coating on the surface of the substrate.

DRAWINGS

These and other features, aspects, and advantages of the present invention will become better understood when the following detailed description is read with reference to the accompanying drawings in which like characters represent like parts throughout the drawings, wherein:

FIG. 1 illustrates a schematic of a heating device surface in accordance with one or more embodiments of the present invention;

FIG. 2A illustrates a schematic of a heating device surface in accordance with one or more embodiments of the present invention.

FIG. 2B illustrates a schematic of a heating device surface in accordance with one or more embodiments of the present invention.

FIG. 3A illustrates a schematic of a heating device surface in accordance with one or more embodiments of the present invention.

FIG. 3B illustrates a schematic of a heating device surface in accordance with one or more embodiments of the present invention.

FIG. 4 shows the images of the stains on a surface of a heating device after wet-wipe cleaning in accordance with some embodiments of the present invention.

DETAILED DESCRIPTION

As discussed in detail below, some of the embodiments of the invention are directed to non-stick, catalytic coatings so as to provide pyrocatalytic activity for low temperature cleanability. The coatings in accordance with some embodiments of the invention may be used to modify the pyrolytic conditions (for example, lower the self-cleaning temperature) without the need for the presence of water or moisture. In this manner, the coatings including the catalyst material may be used to reduce self-cleaning temperatures (for example, less than 850° F. or 455° C.).

Further, without being bound by any theory, it is believed that the non-stick characteristic of the coating may preclude the spreading and/or formation of dense layers of food stains. Thus, the contact surface of the stains formed during cooking may be minimized. Accordingly, the stains may be easily cleaned by wiping or by oxidation, by using the low temperature catalyst in a subsequent low temperature (for example, less than 850° F. or 455° C.) clean cycle heat treatment.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In some embodiments, a heating device is presented. The heating device includes a pyrocatalytic, non-stick coating disposed on at least one surface. The term "pyrocatalytic coating" as used herein refers to a coating including a catalyst material, wherein the coating is capable of catalytically pyrolysing a stain formed on the surface of the coating. The term "non-stick coating" as used herein refers to a coating having a water contact angle greater than about 80 degrees. In some embodiments, the non-stick coating may have a contact angle with the stain material that is less than about 70 degrees. For the sake of brevity, the terms "non-stick pyrocatalytic coating" and "coating" are used herein interchangeably.

The pyrocatalytic non-stick coating includes a binder and a catalyst dispersed within the binder. In some embodiments, the binder is derived from a silane, a polysiloxane, a polysilazane, or combinations thereof. In certain embodiments, the binder includes a condensation product of a silane, a polysiloxane, a polysilazane, or combinations thereof.

In some embodiments, the binder includes a plurality of silicon and oxygen linkages; a plurality of silicon, carbon, and oxygen linkages; a plurality of silicon, carbon, and nitrogen linkages; or combinations thereof. The binder includes a crystalline material, an amorphous material, or combinations thereof.

In certain embodiments, the binder includes a condensation product of at least one polysiloxane. In certain embodiments, the binder includes a condensation product of at least one silane.

In some embodiments, the binder includes a condensation product of at least one silane having a formula (I):

In formula (I), R is independently at each occurrence hydrogen or a non-hydrolysable group, X is independently at each occurrence a hydrolysable group or a hydroxyl group, and a is a number from 0 to 3.

Suitable non-limiting examples of the hydrolysable group X include hydrogen, halogen (F, Cl, Br or I), alkoxy (for example, methoxy, ethoxy, n-propoxy, i-propoxy, or butoxy), aryloxy (for example, phenoxy), acyloxy (for example, acetoxy or propionyloxy), alkylcarbonyl (for example, acetyl), amino, monoalkylamino, dialkylamino, or combinations thereof.

Suitable non-limiting examples of the non-hydrolysable group R include hydrogen, alkyl (for example, methyl, ethyl, n-propyl, isopropyl, n-butyl, s-butyl, t-butyl, pentyl, hexyl, octyl or cyclohexyl), alkenyl (for example, vinyl, 1-propenyl, 2-propenyl, or butenyl), alkynyl (for example, acetylenyl or propargyl), aryl (for example, phenyl or naphthyl), or combinations thereof. Further, it should be noted that one or more of the X and R may further include one or more substituent, such as for example, halogen epoxy, and the like.

In some embodiments, the binder is derived from at least one silane selected from the group consisting of methyltrimethoxysilane, ethyltrimethoxysilane, propyltrimethoxysilane, phenyltrimethoxysilane, vinyltrimethoxysilane, methyltriethoxysilane, ethyltriethoxysilane, propyltriethoxysilane, phenyltriethoxysilane, vinyltriethoxysilane, dimethyldiethoxysilane, diphenyldiethoxysilane, fluoropropyltrimethoxysilane, tridecafluorooctyltrimethoxysilane, tetraethoxysilane, heptadecafluorodecyltrimethoxysilane, epoxy silane, such as, 3-glycidyloxypropyltrimethoxysilane, amino silane, such as, 3-aminopropyltriethoxysilane or 3-(aminoethylamino) propyltriethoxysilane, and combinations thereof.

In some embodiments, the binder is substantially free of fluorine. The term 'substantially free" as used herein means that the binder includes less than about 1 weight percent of fluorine based on the total weight of the binder. Without being bound by any theory, it is believed, that the coating in accordance with some embodiments of the invention may provide for non-stick properties while precluding the use of potentially harmful fluorinated compounds in the coatings.

In some embodiments, the binder may further include a silicate, a phosphate, or combinations thereof. Suitable non-limiting examples include potassium silicate, aluminum phosphate, sodium phosphate, or combinations thereof. In some embodiments, the binder may further include a plurality of inorganic particles, such as, for example, silica. In certain embodiments, the binder may further include a silica sol. In certain embodiments, the binder may include a condensation product of a silica sol and at least one silane, described above.

In some embodiments, the binder may be formed by hydrolysis (if required) and condensation of at least one silane. The hydrolysis and condensation reactions may be effected either in the absence of a solvent, or, alternatively, in an aqueous or aqueous/organic reaction medium. In some embodiments, the reaction medium may further include an acidic or basic condensation catalyst, such as, hydrochloric acid, nitric acid, phosphoric acid, or ammonia. In certain embodiments, the hydrolysis and condensation may be effected under sol-gel process conditions.

As noted, the coating further includes a catalyst dispersed within the binder. The catalyst includes a pervoskite crystalline material, a pyrochlore crystalline material, a spinel crystalline material, an ilmenite crystalline material, or combinations hereof.

The term "pervoskite crystalline material" as used herein refers to a material having a pervoskite crystalline structure. In certain embodiments, the pervoskite crystalline material has a formula:

In formula (I), A and B comprise a cation, wherein A and B represent different cations. In formula (I), X comprises an anion, such as, oxygen, fluorine, and the like. In the pervoskite crystalline structure, A represents a 12-coordinated large cation and B represents a 6-coordinated smaller cation. In some embodiments, the ratio of the A site ions to the B site ions is in a range from about 0.5 to about 1. In some embodiments, the ratio of the A site ions to the B site ions is in a range from about 0.8 to about 1.

In the formula I, A comprises an alkali metal, an alkali earth metal, a lanthanide, bismuth, or combinations thereof, and B comprises an alkali metal, an alkaline earth metal, a 3d transition metal, a 4d transition metal, a 5d transition metal, antimony, tin, or combinations thereof. The term "alkali metal" as used herein refers to Group I elements, for example, lithium, sodium, potassium, rubidium, caesium, or combinations thereof. The term "alkali earth metal" as used herein refers to Group II elements, for example, beryllium, magnesium, calcium, strontium, barium, or combinations thereof. The term "lanthanide" as used herein refers to at least one element of the lanthanide series of the periodic table, for example, lanthanum, cerium, lutetium, and the like. The term "3d transition metal" as used herein refers to period 4 transition element, for example, scandium, titanium, vanadium, chromium, manganese, iron, cobalt, nickel, copper, zinc, or combinations thereof. The term "4d transition metal" as used herein refers to period 5 transition element, for example, yttrium, zirconium, niobium, molybdenum, technetium, ruthenium, rhodium, palladium, silver, cadmium, or combinations thereof. The term "5d transition metal" as used herein refers to period 6 transition element, for example, hafnium, tantalum, tungsten, rhenium, osmium, iridium, platinum, gold, mercury, or combinations thereof.

As will be appreciated by those skilled in the art, the compounds and their general crystalline structure are readily recognizable and may be identified by X-ray diffraction. For example, a perovskite $ABO_3$ crystal structure is generally recognizable as a primitive cube, with the B cation in the middle of the cube ("the B lattice site" or "B site"), the A cation in the corner ("the A lattice site" or "A site") and the oxygen anion in the center of the face edges. The structure may be stabilized by the 6-fold coordination of the B cation and 12-fold coordination of the A cation.

It should also be noted that the A and B symbols in the $ABX_3$ formula noted above may respectively represent more than 1 cation species, depending on the size and valance states of the species in question. Thus, in the general formula $ABX_3$ of the perovskite crystalline material above, A may include a set of cations and/or B may include a set of cations. For example, the perovskite crystalline material may have the formula $(La_{(1-x)}Sr_x)(Co_{(1-y)}Fe_y)O_3$, wherein x and y are numbers greater than 0 and less than 1. In such instance, the A sites in the perovskite crystal lattice are thus filled by either lanthanum (La) or strontium (Sr), and the B sites are filled by either cobalt (Co) or iron (Fe). These substitutions on the A-site and B-site may be made using isovalent ions (i.e., cations having the same charge) or aleovalent ions (i.e., cations having a different charge) to accomplish the specific targeted functionality such as catalysis. Substitution of metal aleovalent cations may generate non-integral numbers of oxygen atoms in the formula. Other examples of such deviation to the stoichiometry may be obtained by making a perovskite crystalline material deficient in the anion. Deviations from stoichiometry for targeted functionality may also be obtained by varying the molar ratios of the A site ions to that of the B site ions.

The term "pyrochlore crystalline material" as used herein refers to a material having a pyrochlore crystalline structure. In certain embodiments, the pyrochlore crystalline material has a formula:

$$A_2B_2X_7 \qquad (II)$$

In formula (II), A and B comprise a cation, wherein A and B represent different cations. In formula (II), X comprises an anion, such as, oxygen, fluorine, and the like. In the formula (II), A comprises an alkali metal, an alkali earth metal, a lanthanide, bismuth, or combinations thereof; and B comprises an alkali metal, an alkaline earth metal, a 3d transition metal, a 4d transition metal, or combinations thereof. The terms "alkali metal", "alkaline earth metal", "lanthanide", "3d transition metal", and "4d transition metal" are defined herein earlier.

In some embodiments, the pyrochlore structure is stabilized by a 12-fold coordination of the A cation and a 6-fold coordination of the B cation, as noted earlier. In other embodiments, the pyrochlore structure is stabilized by a 9-fold coordination of the A cation and 6-fold coordination of the B cation.

The term "spinel crystalline material" as used herein refers to a material having a spinel crystalline structure. In certain embodiments, the spinel crystalline material has a formula:

$$AB_2X_4 \qquad (III)$$

In formula (III), A and B comprise a cation, wherein A and B represent different cations. In formula (III), X comprises an anion, such as, oxygen, fluorine, and the like. In the formula (III), A and B comprise an alkali metal, an alkali earth metal, a 3d transition metal, bismuth, or combinations thereof. The terms "alkali metal", "alkaline earth metal", and "3d transition metal" are defined herein earlier. In the spinel structure, A is a site with either tetrahedral (normal spinel) coordination or octahedral/tetrahedral (inverse spinel) coordination, and B is a site with octahedral coordination.

Other suitable catalytic materials include an ilmenite crystalline material. The term "ilmenite crystalline material" as used herein refers to a compound comprising a titanium-iron oxide crystalline material.

In some embodiments, the catalyst is present in the pyrocatalytic non-stick coating in an amount in a range from about 0.1 weight percent to about 50 weight percent of the pyrocatalytic non-stick coating. In some embodiments, the catalyst is present in the pyrocatalytic non-stick coating in an amount in a range from about 1 weight percent to about 25 weight percent of the pyrocatalytic non-stick coating. In some embodiments, the catalyst is present in the pyrocatalytic non-stick coating in an amount in a range from about 2 weight percent to about 10 weight percent of the pyrocatalytic non-stick coating.

Methods for preparing the above noted crystalline catalyst materials are generally well known. Suitable methods include calcination, precursor based synthesis such as sol-gel, carboxylate gel process, templated synthesis, combustion synthesis including glycine-nitrate synthesis, combustion spray pyrolysis, plasma spraying, or combinations thereof. The catalyst may be characterized, for example, using x-ray diffraction (XRD) for phase purity and BET for specific surface area. Electron micrographs may confirm the surface morphology.

In some embodiments, the catalyst may further include a transition metal oxide, a rare earth metal oxide, or combinations thereof. In some embodiments, the catalyst may further include a mixed metal oxide of a transition metal, a rare earth metal, or combinations thereof. The term "transition metal" as used herein refers to Group III to Group XII metals, such as, for example, scandium, titanium, yttrium, or combinations thereof. The term "rare earth metal" as used herein refers to lanthanide series of metal, such as, for example, lanthanum, cerium, gadolinium, lutetium, or combinations thereof.

In some embodiments, the coating may further include a filler. The filler may include a plurality of particles. In some embodiments, the plurality of particles may have an average particle size in a range from about 1 nanometer to about 100 microns. The filler may provide for one or more additional desired properties, such as for example, non-staining properties, mechanical properties, optical properties, or combinations thereof.

In some embodiments, the coating includes a metal filler, a ceramic filler, or combinations thereof. In some embodiments, the filler includes an oxide, a carbide, a boride, a nitride, an oxynitride, an oxycarbide, or combinations thereof. Suitable ceramic fillers include, for example, carbides, such as, silicon carbide, hafnium carbide, boron carbide, or combinations thereof; oxynitrides, such as, silicon oxynitride; oxycarbohalides, carbonitrides, or combinations thereof; or nitrides, such as, germanium nitride, boron nitride, nickel-chromium nitride, titanium nitride, tantalum nitride, niobium nitride, silicon nitride, aluminum nitride, zirconium nitride, or combinations thereof.

In some embodiments, the coating may include additional compounds that can store and release oxygen to enhance the catalytic oxidation process. These compounds include solid solution oxides, such as, for example, yttria, ceria stabilized zirconia, ceria-yttria-zirconia, ceria-zirconia-bismuth oxide, ceria-zirconia-yttria, bismuth oxide-yttrium oxide, or combinations thereof.

As noted earlier, the coating is disposed on a surface. In some embodiments, the surface includes a metallic material, a ceramic material, a glass material, an enamel material, or combinations thereof. The surface, as noted earlier, is a component of a heating device. In some embodiments, the heating device includes an oven, an iron, or a cooking product. In some embodiments, the surface may include an oven liner surface.

Figure 2A:
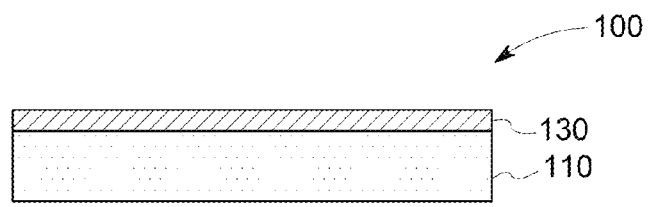
Figure 2B:
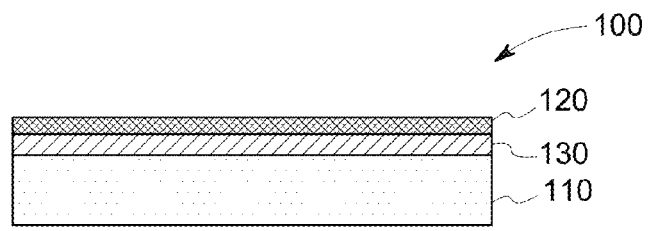

In some embodiments, as indicated in FIG. 1, the heating device includes a metal surface 110, and the pyrocatalytic non-stick coating 120 is disposed directly in contact with the metal surface 110. In some other embodiments, the surface includes an enamel base coat 130, and the enamel base coat 130 includes the pyrocatalytic non-stick coating (FIG. 2A), or, alternatively, the pyrocatalytic non-stick coating 120 is disposed directly in contact with the enamel base coat 130 (FIG. 2B).

Figure 3A:
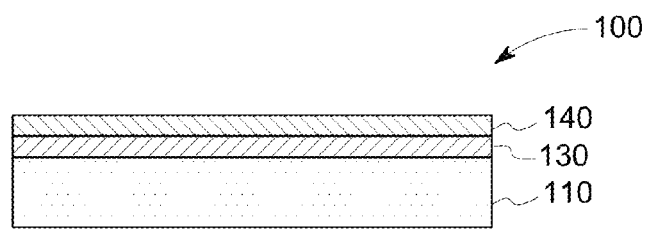
Figure 3B:
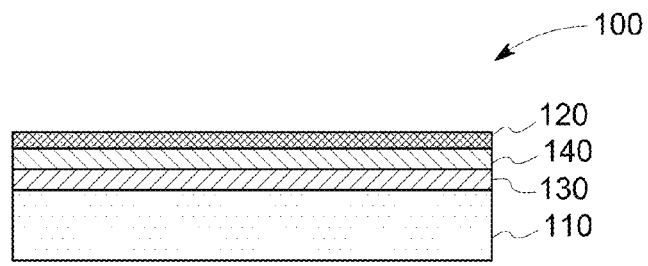

In some other embodiments, the surface 110 includes an enamel base coat 130 and a top coat 140 disposed on the enamel base coat 130. In such embodiments, the top coat 140 includes the pyrocatalytic non-stick coating (FIG. 3A), or, alternatively, the pyrocatalytic non-stick coating 120 is disposed directly in contact with the top coat 140 (FIG. 3B).

In some embodiments, a method of disposing a coating on a surface is presented. The method includes providing a catalyst, wherein the catalyst includes a pervoskite crystalline material, a pyrochlore crystalline material, a spinel crystalline material, an ilmenite crystalline material, or combinations hereof. In some embodiments, the step of providing a catalyst includes providing a catalyst, a catalyst precursor (for example, a salt), or combinations thereof. The catalyst or the catalyst precursor material may include a solid material, a liquid material, or compositions thereof.

The method further includes providing a binder material including a silane, a polysiloxane, a polysilazane, or combinations thereof. In some embodiments, the step of providing a binder material includes providing a binder material, a binder precursor material, or combinations thereof. The binder or the binder precursor material may include a solid material, a liquid material, or compositions thereof.

The method further includes contacting the catalyst with the binder material to form a coating composition. The method further includes disposing the coating composition on a surface of a substrate. In some embodiments, the coating composition may be in the form of a powder, a powder in a slurry, a precursor salt in solution, a sol gel composition, or combinations thereof. Suitable non-limiting examples of methods of disposing the coating composition on the surface includes spin coating, dip coating, screen printing, spray painting, or combinations thereof.

In certain embodiments, the method includes forming a sol-gel composition of the catalyst and the binder material to form the coating composition. In certain embodiments, the method includes forming a slurry of the catalyst and the binder material by sol-gel method to form the coating composition.

Depending on the deposition method, the composition may further include water, fillers, adhesive promoters, coloring agents, and the like. As noted earlier, in some embodiments, the coating further includes a filler. The filler may be introduced in the coating in the form of a sol-gel solution, prior to applying the coating composition to the substrate; or during a heat-treatment step of the coated substrate surface.

As noted earlier, in some embodiments, the coating composition may be disposed directly in contact with a metal surface. In such embodiments, the metal surface to which the coating composition is applied may be subjected to one or more of degreasing, etching, and neutralization, where applicable. In some embodiments, the coating composition may disposed on a partially baked cover coat disposed on the substrate surface In some other embodiments, the coating composition may be blended with a top coat composition, and processed on the substrate as an enamel glaze. In some other embodiments, the coating composition may be disposed on the ground coat itself, as the final and functional cover coat.

The method further includes heat-treating the coating composition to form a pyrocatalytic non-stick coating on the surface of the substrate. In some embodiments, the method includes heat-treating the coating composition at a temperature in a range from about 280° C. to about 850° C. In some embodiments, the method includes heat-treating the coating composition at a temperature in a range from about 400° C. to about 650° C. In some embodiments, the method includes heat-treating the coating composition at a temperature in a range from about 280° C. to about 320° C.

The heat treatment may be carried out in air on in an inert gas, such as, nitrogen or argon. The heat treatment may be accompanied, for example, by drying, curing, consolidation, or compaction of the coating composition. In some embodiments, the resultant coating may be further processed to achieve the desired finish.

In some embodiments, a self-cleaning oven is presented. The self-cleaning oven includes an enameled surface defining at least a portion of an oven chamber, and a pyrocatalytic, non-stick coating disposed on the enameled surface. The pyrocatalytic non-stick coating includes (i) a binder derived from a silane, a polysiloxane, a polysilazane, or combinations thereof; and (ii) a catalyst dispersed within the binder, wherein the catalyst includes a pervoskite crystalline material, a pyrochlore crystalline material, a spinel crystalline material, an ilmenite crystalline material, or combinations hereof.

As noted earlier, the combination of the non-stick and pyrocatalytic characteristics of the coatings may enable easy clean up and preclude staining of the surfaces. As noted earlier, the coatings in accordance with some embodiments of the invention may be used to lower the self-cleaning temperature (for example, less than 850° F. or 455° C.). Further, without being bound by any theory, it is believed that the non-stick characteristic of the coating may preclude the spreading and formation of dense layers of greasy food stains, and the stains may be thus easily cleaned by wiping or by oxidizing using the low temperature catalyst in a subsequent low temperature (for example, less than 850° F. or 455° C.) clean cycle heat treatment.

Further, without being bound by any theory, it is believed that the incorporation of wipe cleanability in combination with the low temperature catalytic cleaning feature may preclude the need for special hardware and insulation, while enhancing the long-term life and appearance of the heating device.

EXAMPLES

Comparative Example 1 As-Received Oven Panel Surface; No Coating

In this example, an oven panel section of dimensions 1.5"×1.5" from a GE oven currently used in the market was used as-is, without a catalyst coating Comparative Example 2 Coating Including a Catalyst Material, and No Binder In this example, lanthanum strontium ferrite (LSF) catalyst was mixed in α-terpineol (at a concentration of up to 70 wt %) using a three-roll mill or a high speed centrifugal mixer to form a homogeneous paste. The catalyst paste was painted onto an enameled oven panel section. The coated panel section was dried in an oven at 100° C. for 2 hours and then heat-treated at 725° C. in air for 10-15 minutes.

Comparative Example 3 Coating Including Thermolon Binder, and No Catalyst

In this example, a Thermolon coating was disposed on an oven panel section. Thermolon HCRS Gray was applied on an aluminized steel panel and then baked for 10 minutes at 60 to 80° C. The coated panel section was heat-treated at a temperature between 280° C. to 320° C. in air for 10-15 minutes.

Comparative Example 4 Coating Including a Catalyst Material, and a Fumed Silica Binder In this example, lanthanum strontium ferrite (LSF) catalyst was mixed with fumed silica in α-terpineol (at a concentration of up to 70 wt %) using a three-roll mill or a high speed centrifugal mixer to form a homogeneous paste. The catalyst paste was painted onto an oven panel section. The coated panel section was dried in an oven at 100° C. for 2 hours and then heat-treated at 725° C. in air for 10-15 minutes.

Example 1 Coating Including a Catalyst Material, and a Thermolon Binder

In this example, lanthanum strontium ferrite (LSF) catalyst was mixed with Thermolon coating composition in α-terpineol (at a concentration of up to 70 wt %) using a three-roll mill or a high speed centrifugal mixer to form a homogeneous paste. The catalyst paste was painted onto an oven panel section. The coated panel section was dried in an oven at 100° C. for 2 hours and then heat-treated at a temperature between 280 to 320° C. in air for 10-15 minutes.

The coated panels of Comparative Examples 1-4 and Example 1 were evaluated to determine the cleanability effectiveness using AHAM stain testing procedure. After staining, the samples were then exposed to a self-clean cycle, which included heating the various stained samples in a furnace at 288° C. for 4 hours in air. A wet paper towel was then used to remove the food residue.

Figure 4:
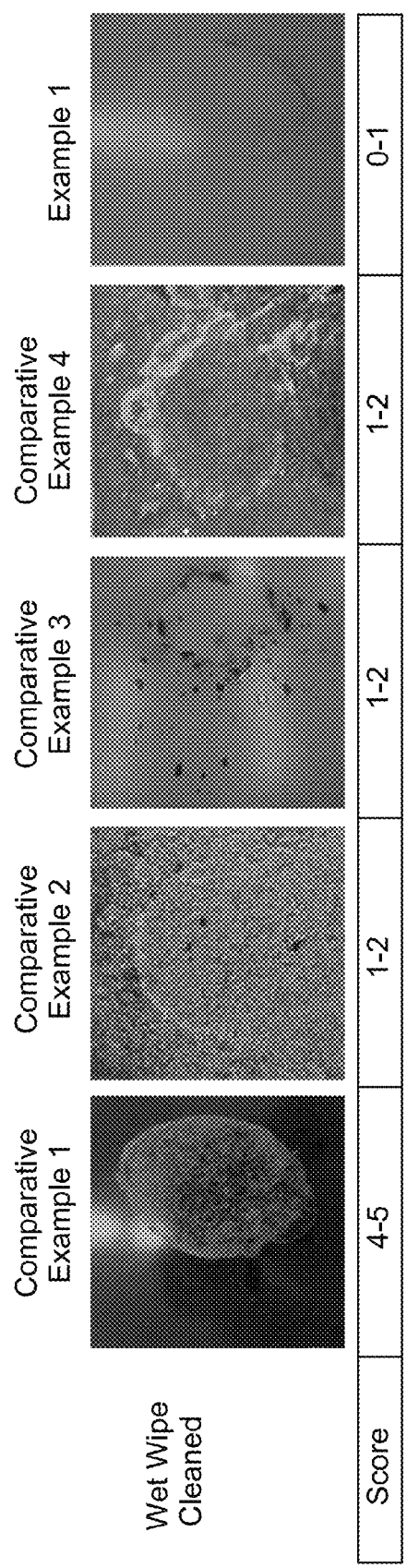

FIG. 4 and Table 1 summarize the cleanability results provided in Example 1 relative to the Comparative Examples 1-4. The table provides qualitative rankings on a scale of 1 to 5, wherein a panel with a ranking of 5 exhibited poor cleanability, e.g., significant food residue (~100%) that was not removable with scrubbing; and panel with a ranking of 1 exhibited easy cleanability, e.g., complete combustion of the food stain.

TABLE 1

| Example | Cleanability Ranking |
| --- | --- |
| Comparative Example 1 | 4-5 |
| Comparative Example 2 | 1-2 |
| Comparative Example 3 | 1-2 |
| Comparative Example 4 | 1-2 |
| Example 1 | 0-1 |

As illustrated in FIG. 4 and Table 1, Example 1 showed improved cleaning performance compared to Comparative Examples 1-4. In particular, Example 1 showed better cleaning performance when compared to Comparative Example 2 (catalyst without a binder) and Comparative Example 3 (binder without a catalyst). Further, it should be noted that the coatings, in accordance with some embodiments of the invention, as illustrated in FIG. 4, may also provide for smoother surface, with smaller number of pores, when compared to coatings without the binder (Comparative Example 2) or including a silicate binder (Comparative Example 4). The appearance of the coating may be further enhanced, and the coating life may be increased by using the combination of the catalyst and the binder.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:
1. A heating device, comprising:
an enamel base coat disposed on at least one surface of the heating device; and
a top coat disposed on the enamel base coat, the top coat comprising a pyrocatalytic, non-stick coating, the pyrocatalytic non-stick coating comprising:
(i) a binder comprising a condensation product of a silica sol and at least one silane, the at least one silane including methyltrimethoxysilane; and

(ii) a pyrolysis catalyst dispersed within the binder, wherein the catalyst comprises a perovskite crystalline material, a pyrochlore crystalline material, a spinel crystalline material, an ilmenite crystalline material, or combinations thereof; wherein
the pyrocatalytic, non-stick coating is a final coating on the at least one surface and the pyrocatalytic, non-stick coating is free of fluorine.

2. The heating device of claim 1, wherein the perovskite crystalline material has a formula:

$$ABX_3 \qquad (I)$$

wherein A and B comprise a cation, and X comprises an anion;
wherein A comprises an alkali metal, an alkali earth metal, a lanthanide, bismuth, or combinations thereof, and wherein B comprises an alkali metal, an alkaline earth metal, a 4d transition metal, a 5d transition metal, antimony, tin, or combinations thereof.

3. The heating device of claim 1, wherein the pyrochlore crystalline material has a formula:

$$A_2B_2X_7 \qquad (II)$$

wherein A and B comprise a cation, and X comprises an anion,
wherein A comprises an alkali metal, an alkali earth metal, a lanthanide, bismuth, or combinations thereof, and wherein B comprises an alkali metal, an alkaline earth metal, a 3d transition metal, a 4d transition metal, or combinations thereof.

4. The heating device of claim 1, wherein the spinel crystalline material has a formula:

$$AB_2X_4 \qquad (III)$$

wherein A and B comprise a cation, and X comprises an anion, wherein A and B comprise an alkali metal, an alkali earth metal, a 3d transition metal, bismuth, or combinations thereof.

5. The heating device of claim 1, wherein the catalyst is present in the pyrocatalytic non-stick coating in an amount in a range from about 1 weight percent to about 50 weight percent of the pyrocatalytic non-stick coating.

6. The heating device of claim 1, wherein the pyrocatalytic non-stick coating further comprises a filler.

7. The heating device of claim 6, wherein the filler comprises an oxide, a carbide, a boride, a nitride, an oxycarbide, an oxynitride, or combinations thereof.

8. The heating device of claim 1, wherein the at least one surface comprises a metallic material, a ceramic material, a glass material, or combinations thereof.

9. The heating device of claim 1, the binder further comprising tetraethoxysilane.

10. A method, comprising:
(i) providing a pyrolysis catalyst comprising a perovskite crystalline material, a pyrochlore crystalline material, a spinel crystalline material, an ilmenite crystalline material, or combinations thereof;
(ii) providing a binder material comprising a condensation product of a silica sol and at least one silane, the at least one silane including methyltrimethoxysilane;
(iii) contacting the pyrolysis catalyst with the binder material to form a coating composition;
(iv) disposing an enamel base coat on a surface of a substrate;
(v) disposing the coating composition on the enamel base coat such that the coating composition is a final coating on the surface of the substrate; and
(vi) heat-treating the coating composition to form a pyrocatalytic non-stick coating on the surface of the substrate; wherein the coating composition is free of fluorine.

11. The method of claim 10, wherein the step (v) comprises heat-treating the coating composition at a temperature in a range from about 280° C. to about 850° C.

12. The method of claim 10, wherein the substrate is a component of a heating device.

* * * * *